S. H. SCRIBNER.
Churn.
No. 67,594.
Patented Aug. 6, 1867.
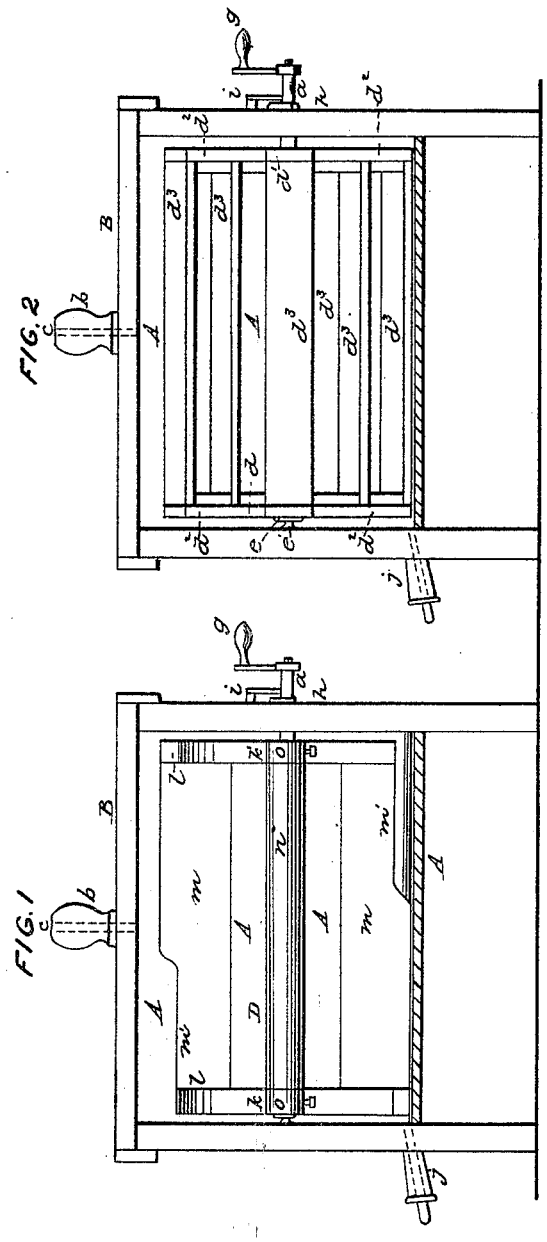
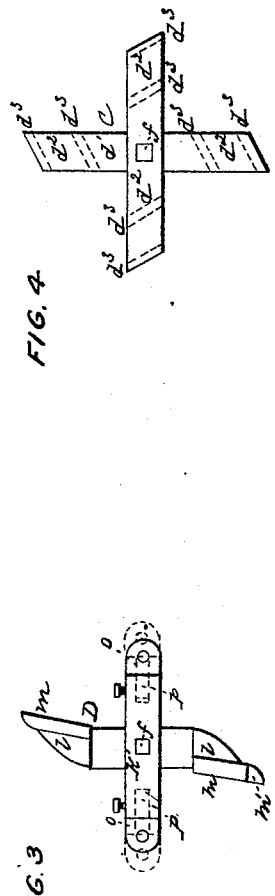
WITNESSES:
D. Durand
C. Davis
INVENTOR:
Saml. H. Scribner
By Wiedersheim &c

United States Patent Office.

SAMUEL H. SCRIBNER, OF STOWE, VERMONT.

*Letters Patent No. 67,594, dated August 6, 1867.*

IMPROVEMENT IN COMBINED CHURN AND BUTTER-WORKER.

*The Schedule referred to in these Letters Patent and making part of the same.*

TO ALL WHOM IT MAY CONCERN:

Be it known that I, SAMUEL H. SCRIBNER, of Stowe, in the county of Lamoille, and State of Vermont, have invented a new and improved Combined Churn and Butter-Worker; and I do hereby declare the following to be a full and correct description of the same, sufficient to enable others skilled in the art to which my invention appertains to understand and make the same, reference being had to the accompanying drawings, which make part of this specification, and in which—

Figure 1 is a side elevation of the machine when used as a butter-worker, one part of the box being cut away to expose the interior.

Figure 2 is a similar view of the machine when used as a churn.

Figure 3 is an end elevation of the dasher used for working butter, and

Figure 4 is an end elevation of the dasher used for churning.

Similar letters of reference indicate corresponding parts in the several figures.

The nature of my invention consists in combining with a churn a butter-worker, by using different and peculiarly-constructed dashers.

A may represent the semicircular box of the machine, provided with a lid B, the handle $b$ of which has an air-passage, $c$. The dasher C, figs. 2 and 4, consists of the two crosses $d$ $d^1$, forming each four arms $d^2$. Between each parallel two of these arms are two cross-pieces, $d^3$ $d^3$, set diagonally to the centre of the dasher, each four of these cross-pieces being in line with and parallel to each other. At the centre of its outer surface the cross $d$ is provided with a plate, $e$, forming one bearing of the dasher on the point $e'$. The other cross is provided with a square hole, $f$, to receive the square end of the shaft $a$, to which is attached a handle, $g$, and which passes through the end of the box A, being held in position and forming the second bearing for the dasher C by having a groove cut on its circumference, into which fits a semicircular clamp, $h$, pivoted to the end of the box A, and sliding vertically in the staple $i$. J is an outlet, to allow the milk to be drawn off after the churning. Fig. 1 shows the churn when used as a butter-worker. The outer edges of two of the ends of each cross $k$ $k'$ of the dasher D are curved, as shown at $l$ in fig. 3, and between each two of these ends are held beaters $m$ $m$, the outer edge of which is slightly curved and partially cut away, as shown at $m'$. Between each two of the other ends are held rollers $n$ $n$, which have their bearings in block $o$, the smaller ends of which slide in grooves $p$ of the ends of the cross D, so as to enable the rollers to be placed nearer to or farther from the bottom of the churn, and are securely held in position by set-screws. This dasher D has similar bearings as the dasher C.

The operation of my machine is as follows: The cream being placed within the box A, the dasher C is placed within the same, and the shaft $a$ and handle $g$ are attached. On revolving the dasher C the cross-pieces $d^3$ $d^3$ cut into the cream, and forcing it between the cross-pieces, allow it to fall over the same over a considerable space of air, which causes the cream to bubble and keeps it in constant agitation. When the churning is done, the buttermilk is drawn off through the outlet J, and the dasher D substituted for dasher C. When the dasher D is revolved, the beaters $m$ gather and flatten the butter on the bottom of the box A, and the resistance is lessened as their edges are cut away, as shown at $m'$, which allow air, fluid, or lumps to pass under at one side to be operated on by the other beater $m$. The rollers $n$ $n$ press the butter and force out of it any fluid still remaining, which is drained off through the outlet J.

Having thus described my invention, what I claim as new, and desire to secure by Letters Patent, is—

1. The churn-dasher C, constructed of the crosses $d$ $d^1$, provided with cross-pieces $d^3$ $d^3$ set diagonally to the centre, each four of the same being in line with and parallel to each other, constructed and arranged as described.

2. The butter-worker dasher D, constructed of the cross $k$ $k'$, beaters $m$ $m$, and adjustable rollers $n$ $n$, substantially as and for the purposes set forth.

SAML. H. SCRIBNER.

Witnesses:
C. DAVIS,
D. OURAND.